United States Patent
Li et al.

(10) Patent No.: US 8,782,030 B1
(45) Date of Patent: Jul. 15, 2014

(54) USING A QUERY LOG FROM A TWO-BOX INTERFACE TO IDENTIFY STANDALONE LOCATIONS

(75) Inventors: Xin Li, North Bergen, NJ (US); Dolapo Falola, New York, NY (US); David Blackman, New York, NY (US)

(73) Assignee: Google Inc., Mountain View, CA (US)

( * ) Notice: Subject to any disclaimer, the term of this patent is extended or adjusted under 35 U.S.C. 154(b) by 1080 days.

(21) Appl. No.: 11/788,722

(22) Filed: Apr. 20, 2007

(51) Int. Cl.
*G07F 7/00* (2006.01)

(52) U.S. Cl.
USPC .......................................................... 707/708

(58) Field of Classification Search
USPC .................................................... 707/5, 708
See application file for complete search history.

(56) References Cited

U.S. PATENT DOCUMENTS

| | | |
|---|---|---|
| 6,618,727 B1 * | 9/2003 | Wheeler et al. ................ 707/748 |
| 2004/0073534 A1 * | 4/2004 | Robson .............................. 707/1 |
| 2006/0106778 A1 * | 5/2006 | Baldwin ............................ 707/3 |
| 2006/0271518 A1 | 11/2006 | Wang et al. |
| 2008/0082477 A1 * | 4/2008 | Dominowska et al. ............ 707/1 |

OTHER PUBLICATIONS

Office Action as prepared for related case (U.S. Appl. No. 11/607,568), mailed from USPTO on Oct. 15, 2008.
Martins, Bruno et al., "Handling Locations in Search Engine Queries", GIR' 06, Aug. 10, 2003.
Wang, Lee et al., "Detecting Dominant Locations from Search Queries", SIGIR '05, Aug. 15-19, 2005, pp. 424-431.

* cited by examiner

*Primary Examiner* — Apu Mofiz
*Assistant Examiner* — Ajith Jacob
(74) *Attorney, Agent, or Firm* — McDermott Will & Emery LLP

(57) ABSTRACT

One embodiment of the present invention provides a system that automatically identifies a standalone location, wherein a standalone location is a location which can be unambiguously identified by a name for the location alone. During operation, the system receives inputs from an interface for a search engine, wherein the interface includes two or more boxes, including a non-location box for receiving terms specifying what a user is searching for in a query, and a location box for receiving terms specifying a geographic location associated with the query. Next, the system receives a term to be evaluated. The system then uses the inputs to determine: a non-location score for the term which indicates how frequently the term appears in the non-location box; and a location score for the term which indicates how frequently the term appears in the location box. Next, the system determines whether the term is a standalone location based on the non-location score and the location score for the term.

19 Claims, 4 Drawing Sheets

USING A QUERY LOG FROM A TWO-BOX INTERFACE TO IDENTIFY STANDALONE LOCATIONS

RELATED APPLICATION

The subject matter of this application is related to the subject matter in a co-pending non-provisional application by inventors Xin Li, Jiang Qian, Daniel T. Egnor and Lawrence E. Greenfield, entitled, "Method and Apparatus for Identifying Standalone Locations," having Ser. No. 11/607,568, and filing date 1 Dec. 2006.

BACKGROUND

1. Field of the Invention

The present invention relates generally to search engines. More specifically, the present invention relates to techniques for identifying "standalone locations," that can be unambiguously identified by the names for the locations alone.

2. Related Art

Standalone locations are the locations that can be unambiguously identified by their names alone, either within a specific geographic region or globally. For example, the name "San Francisco" usually refers to "San Francisco, Calif., Unites States" even without additional location specifiers like "California", and "United States" (so it is standalone location). However, the name "Washington" as a location could refer to the "City of Washington" in the state of Missouri, "Washington, D.C." or "Washington State", so it is not strictly a standalone location in the United States. Moreover, a large number of locations are not standalone because they do not have names that uniquely identify them; an extreme case is the city of "Orange" in the state of Texas: just given its name, most people do not think it is a location.

The ability to identify standalone locations within a query has a huge impact on quality of a search results generated by the query. Without such knowledge, the query processor cannot tell the difference between an obvious location query such as "new york pizza" (new york is a location) and an obvious non-location query such as "orange juice" (orange could be a location, but not here).

Unfortunately, some query terms contain a component which appears to be related to a location, but the entire query term is not actually related to the location. It is advantageous to place such terms in a "location blacklist." For example, the location blacklist can include terms such as: "Orlando Bloom," wherein the component "Orlando" is typically related to a location but the entire query term "Orlando Bloom" is the name of a person; and "Victoria's Secret," wherein the component "Victoria" can be a location but the entire query term "Victoria's Secret" is not.

Hence, what is needed is a method and an apparatus for automatically identifying standalone locations and terms that belong in a location blacklist without the above-described problems.

SUMMARY

One embodiment of the present invention provides a system that automatically identifies a standalone location, wherein a standalone location is a location which can be unambiguously identified by a name for the location alone. During operation, the system receives inputs from an interface for a search engine, wherein the interface includes two or more boxes, including a non-location box for receiving terms specifying what a user is searching for in a query, and a location box for receiving terms specifying a geographic location associated with the query. Next, the system receives a term to be evaluated. The system then uses the inputs to determine: a non-location score for the term which indicates how frequently the term appears in the non-location box; and a location score for the term which indicates how frequently the term appears in the location box. Next, the system determines whether the term is a standalone location based on the non-location score and the location score for the term.

In a variation on this embodiment, the system receives the term from a list of known locations.

In a variation on this embodiment, the system determines the number of times, N, that the term t appears in the non-location box and computes the non-location score $S_N(t)=\log(N+1)$ for the term t. The system also determines the number of times, L, that the term t appears in the location box and computes the location score $S_L(t)=\log(L+1)$ for the term t. The system then computes a normalized location indicator $P_L(t)=S_L(t)/(S_L(t)+S_N(t))$. Next, the system determines that the term t is a standalone location if $P_L(t)$ is greater than a standalone threshold.

In a variation on this embodiment, the system receives a query comprised of terms from a user. If a term in the query is the name for a standalone location, the system uses location information for the standalone location while producing and/or ranking search results for the query. Next, the system presents the search results to the user.

In a variation on this embodiment, the system determines whether the term belongs in a blacklist for locations because the term contains a location component but the term is not actually related to a location.

In a further variation on this embodiment, the system determines whether the term belongs in the blacklist for locations based on the non-location score and the location score for the term.

In a variation on this embodiment, the term is in one of the following languages: Chinese; Japanese; Korean; or English.

Another embodiment of the present invention provides a system that automatically identifies a term that belongs in a blacklist for locations because the term contains a component which appears to be related to a location but the term is not actually related to the location. During operation, the system receives inputs from an interface for a search engine, wherein the interface includes two or more boxes, including a non-location box for receiving terms specifying what a user is searching for in a query, and a location box for receiving terms specifying a geographic location associated with the query. The system then receives a term to be evaluated. Next, the system uses the inputs to determine: a non-location score for the term which indicates how frequently the term appears in the non-location box; and a location score for the term which indicates how frequently the term appears in the location box. The system next determines whether the term belongs in a blacklist for locations based on the non-location score and the location score for the term.

In a variation on this embodiment, the system determines the number of times, N, that the term t appears in the non-location box and computes the non-location score $S_N(t)=\log(N+1)$ for the term t. The system also determines the number of times, L, that the term t appears in the location box and computes the location score $S_L(t)=\log(L+1)$ for the term t. The system then computes a normalized location indicator $P_L(t)=S_L(t)/(S_L(t)+S_N(t))$. Next, the system determines that the term t belongs in a blacklist for locations if $P_L(t)$ is less than a blacklist threshold.

In a further variation on this embodiment, while determining whether the term t belongs in the blacklist for locations, the system sends the term t as a query to a location extraction server (LES) to determine whether the term t gets triggered as a location query. If so, and if $P_L(t)$ is less than a blacklist threshold, the system then determines that the term t belongs in the blacklist for locations.

In a variation on this embodiment, the system receives a query comprised of terms from a user. If a term in the query appears in the blacklist, the system does not use the term as a source of location information while producing and/or ranking search results for the query. Next, the system presents the search results to the user.

In a variation on this embodiment, the term is in one of the following languages: Chinese; Japanese; Korean; or English.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In one embodiment of the present invention, the system determines if a specific term represents a standalone location by determining both a location score and a non-location score for the term. Specifically, the system determines the location score and the non-location score for the term based on user inputs received through a query interface. This query interface includes at least two input boxes, which include a non-location box for receiving terms specifying what a user is searching for in a query, and a location box for receiving terms specifying a geographic location associated with the query. The system then constructs a query log for each term wherein the query log summarizes the numbers of times that term appears in the location box and the non-location box. Next, the system computes the location score and non-location score based on the query log for the term.

In one embodiment of the present invention, the system uses the location score and the non-location score for a term to determine if the term belongs in a blacklist for locations.

Techniques for automatically identifying a term as a standalone location or as a term which belongs in a location blacklist are discussed in more detail below, but first we describe generally how a search engine operates.

Crawling, Ranking and Searching Processes

Figure 1:
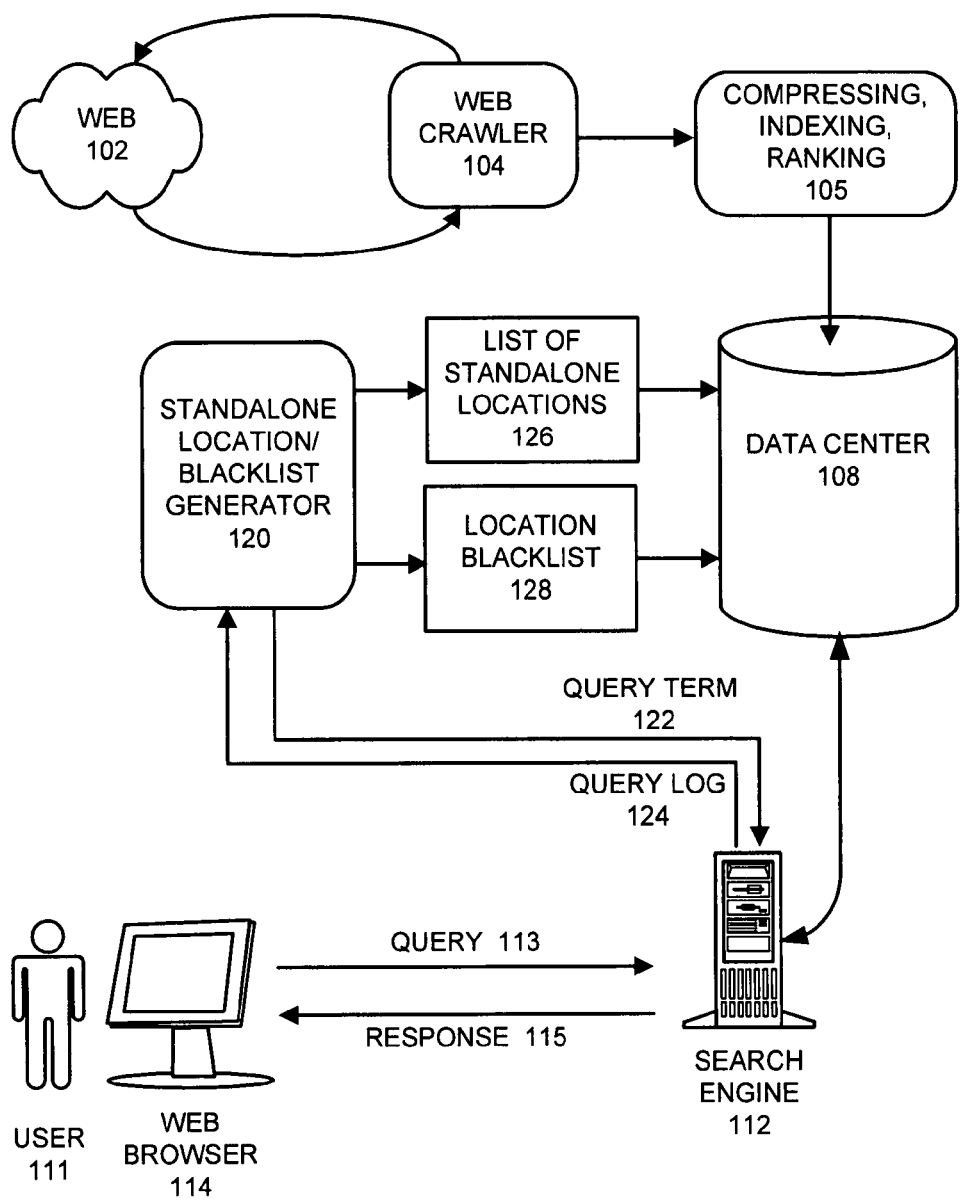
FIG. 1 illustrates the crawling, ranking and searching processes for a search engine in accordance with an embodiment of the present invention.

FIG. 1 illustrates the crawling, ranking and searching processes for a search engine in accordance with an embodiment of the present invention. During the crawling process, a web crawler 104 crawls or otherwise searches through websites on web 102 to select web pages to be stored in indexed form in data center 108. The selected web pages are then compressed, indexed and ranked in module 105 before being stored in data center 108.

During a subsequent search process, a search engine 112 receives a query 113 from a user 111 through a Web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through Web browser 114, wherein the response 115 contains matching pages along with ranking information and references to the identified documents.

During the searching process, search engine 112 uses a list of standalone locations 126 to identify query terms that specify a location. This location information can be used to improve the searching process by narrowing the search to pages that are associated with the specific location. This makes the search results more relevant to a user who is associated with the location.

Additionally, search engine 112 can use a location blacklist 128 to identify query terms that contain a component which appears to be related to a location but the term is not actually related to that location. If such a term is identified in query 113, search engine 112 filters out returned pages that are associated with that location so that these pages are not included in response 115.

In one embodiment of the present invention, the list of standalone locations and the location blacklist are automatically generated by a standalone location/blacklist generator 120. During operation, standalone location/blacklist generator 120 sends query terms, such as query term 122, to search engine 112 and receives responses from search engine 112. Standalone location/blacklist generator 120 also receives a query log 124 from each engine 112. Standalone location/blacklist generator 120 subsequently determines if query term 122 is a standalone location or if query term 122 belongs in the location blacklist based on the responses and query log 124. This automatic process is described in more detail below with reference to FIGS. 2, 3, and 4.

Two-Box Query Interface and Query Log

Figures 2, 3:
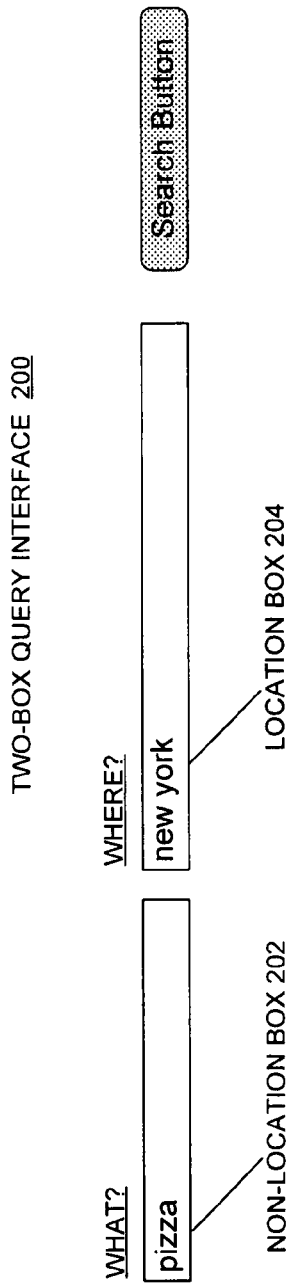
FIG. 2 illustrates a two-box query interface in accordance with an embodiment of the present invention.
FIG. 3 illustrates an exemplary query log summarizing the number of times each term is used as a location and as a non-location in the two-box query interface in accordance with an embodiment of the present invention.

FIG. 2 illustrates a two-box query interface 200 in accordance with an embodiment of the present invention. More specifically, interface 200 comprises a non-location box 202, which receives terms that describe "what" a user is searching for in a query, and a location box 204, which receives terms that specify a geographic location associated with the query. For example, if a user is looking for pizza in New York, instead of entering the entire query "pizza new york" in a single query box, the user enters term "pizza" in non-location box 202, and separately enters term "new york" in location box 204. In another example, if a user is looking for movie theaters in Pittsburgh, the user enters the term "movie theater" in non-location box 202, and separately enters the term "Pittsburgh" in location box 204.

Note that although we describe a two-box interface 200 for receiving location component and non-location component of a query in separated boxes, a query interface can also include more than two boxes.

FIG. 3 illustrates an exemplary query log 300 summarizing the number of times each term is used as a location and as a non-location in two-box query interface 200 in accordance with an embodiment of the present invention.

After observing and receiving a sufficiently large number of user inputs from interface 200, each reoccurring term t can be summarized in query log 300 to obtain the following two numbers:

A location number L which indicates the number of times that the term t is used as a location (i.e. appeared in location box 204);

A non-location number N which indicates the number of times that the term t is used as a non-location (i.e. appeared in non-location box 202).

Note that a standalone location term is more likely to appear in the location box than in the non-location box, whereas a non-location term is more likely to appear in the non-location box than in the location box. For example, query log 300 shows that "New York" appears significantly more frequently in the location box than it appears in the non-location box. In contrast, "Pizza" appears predominantly in the non-location box because it is a non-location.

Figure 4:
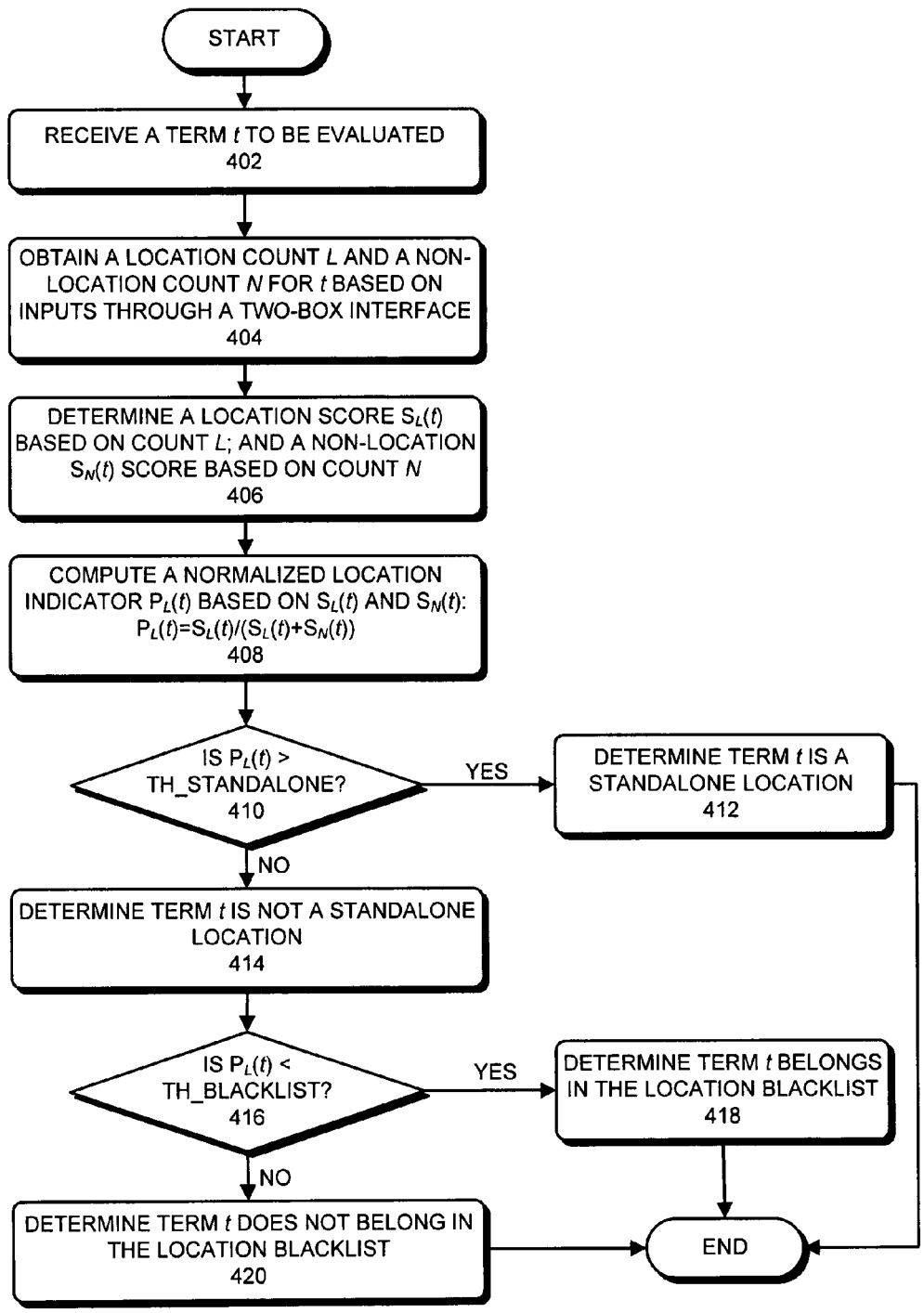
FIG. 4 presents a flow chart illustrating the process of determining whether a term is a standalone location or belongs in a location blacklist in accordance with an embodiment of the present invention.

Determining Whether a Term is a Standalone Location or Belongs in a Location Blacklist FIG. 4 presents a flow chart illustrating the process of determining whether a term is a standalone location or belongs in a location blacklist in accordance with an embodiment of the present invention. During this process, the system receives a term t to be evaluated (step 402). Note that term t can be a query term received through a query interface. Alternatively, term t can be received from an automatically generated list of locations. Note that term t can be in different languages, such as: Chinese, Japanese, Korean, and English.

The system then obtains a location count L and a non-location count N for term t based on user inputs received through a two-box interface as described above (step 404). In one embodiment of the present invention, the system obtains numbers L and N for term t from a query log which summaries the input counts for the term in the location box and the non-location box.

Next, the system determines a location score $S_L(t)$ based on L, which indicates how frequently term t appears in the location box (step 406). The system additionally determines a non-location score $S_N(t)$ based on N, which indicates how frequently term t appears in the non-location box (step 406).

In one embodiment of the present invention, the system computes location score $S_L(t)$ and non-location score $S_N(t)$ according to:

Location score $S_L(t)$: $S_L(t)=\log(L+1)$; and
Non-Location score $S_N(t)$: $S_N(t)=\log(N+1)$.

Note that in this embodiment, both $S_L(t)$ and $S_N(t)$ are greater or equal to zero. Also note that although we use the log( ) function to compute both $S_L(t)$ and $S_N(t)$, many other functions can possibly be used to compute $S_L(t)$ and $S_N(t)$ based on counts L and N.

The system next computes a normalized location indicator $P_L(t)$ based on location score $S_L(t)$ and non-Location score $S_N(t)$ (step 408). In one embodiment of the present invention, $P_L(t)$ is computed according to: $P_L(t)=S_L(t)/(S_L(t)+S_N(t))$.

An ideal location term t is associated with a count $L \gg 0$ and $N=0$. Hence, $S_L(t) \gg 0$, $S_N(t)=0$, and $P_L(t)=1$. Furthermore, an ideal non-location term t is associated with a count $L=0$ and $N \gg 0$. Hence, $S_L(t)=0$, $S_N(t) \gg 0$, and $P_L(t)=0$. However in practice, a given term t is associated with a normalized location indicator $P_L(t)$ with a value between 0 and 1.

The system then determines whether term t is a standalone location by comparing $P_L(t)$ with a standalone threshold—TH_standalone (step 410).

If $P_L(t)>$TH_standalone, the system determines that term t is a standalone location (step 412). Otherwise, the system determines that term t is not a standalone location (step 414).

In one embodiment of the present invention, the system assembles a standalone location list which includes those terms that have been determined to be standalone locations. If the standalone location list has already been created, each newly determined standalone location can be appended to the list.

If term t is not a standalone location, the system next determines whether term t belongs in a location blacklist by comparing normalized location indicator $P_L(t)$ with a blacklist threshold—TH_blacklist (step 416).

If $P_L(t)<$TH_blacklist, the system determines that term t belongs in the location blacklist (step 418). Otherwise, the system determines that term t does not belong in the location blacklist (step 420).

In another embodiment of the present invention, the condition $P_L(t)<$TH_blacklist is a necessary but not a sufficient condition to determine that term t belongs in the location blacklist. In this embodiment, if $P_L(t)<$TH_blacklist, the system sends term t to a location extraction server (LES) to determine whether term t gets triggered as a location query. If so, the system determines that t belongs in the location blacklist. Otherwise, the system determines that term t does not belong in the location blacklist.

Note that the LES is typically triggered when an input term contains a component which appears to be related to a location, even if that term is not actually related to the location. For example, term "Orlando Bloom" will cause the LES to extract "Orlando" from the term, even thought the term is not a location. However, a term that does not contain any location typically does not trigger the LES. Consequently, the system can use the LES to filter out terms that have small $P_L(t)$ values but do not contain a location. This prevents the system from including too many terms in the location blacklist.

Note that the two thresholds are chosen so that they satisfy the condition 0<TH_blacklist<TH_standalone<1. Moreover, these threshold values can be dynamically adjusted according to frequency data in the query log.

Note that the above technique can be used to generate standalone locations and location blacklists in multiple languages, including but not limited to: Chinese, Japanese, Korean, and English.

Processing a Query Using Standalone Locations

Figure 5:
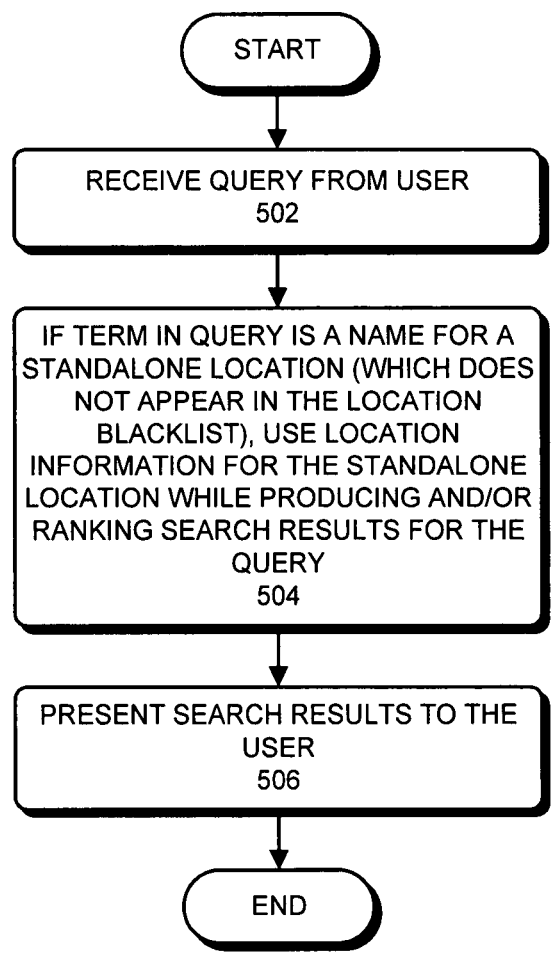
FIG. 5 presents a flowchart illustrating the process of using a list of standalone locations to process a query in accordance with an embodiment of the present invention.

FIG. 5 presents a flowchart illustrating the process of using a list of standalone locations to process a query in accordance with an embodiment of the present invention. During this process, the system receives a query which comprises search terms from a user (step 502). Next, if a search term in the query is the name for a standalone location (which does not appear in the location blacklist), the system uses location information for the standalone location while producing and/or ranking search results for the query (step 504). For example, these search results can include pages associated with search terms in the query. Finally, the system presents the search results to the user (step 506).

The foregoing descriptions of embodiments have been presented for purposes of illustration and description only. They are not intended to be—exhaustive or to limit the present description to the forms disclosed. Accordingly, many modifications and variations will be apparent to practitioners skilled in the art. Additionally, the above disclosure is not intended to limit the present description. The scope of the present description is defined by the appended claims

What is claimed is:

1. A method for automatically identifying a standalone location, comprising, in a computer, performing the operations of:
   receiving a term to be evaluated, the term including one or more words; retrieving a non-location score for the term, wherein the non-location score is determined from log data, the log data indicating how frequently the term was entered within a non-location input box, the non-location input box for specifying what a user is searching for in search queries;
   retrieving a location score for the term, wherein the location score is determined from the log data, the log data indicating how frequently the term was entered within a location input box, the location input box for specifying a geographical location associated with search queries; and
   determining, at a computer, whether the term is a standalone location based on the non-location score and the location score, wherein a standalone location is a geographic location that is identifiable by its name alone.

2. The method of claim 1, wherein the non-location score for the term is determined from the number of times that the term appears in the non-location box of a search engine interface that includes the non-location box for receiving terms specifying what a user is searching for and the location box for receiving terms specifying a geographic location within which the user is searching.

3. The method of claim 1, wherein, upon determining that the term is a standalone location, the method further comprises using location information for the standalone location to rank search results responsive to queries that contain the term.

4. The method of claim 1, wherein, upon determining that the term is not a standalone location, the method further comprises determining whether the term belongs in a location blacklist, wherein the location blacklist contains terms that include the name of a location but that do not refer to locations.

5. The method of claim 4, wherein determining that the term belongs in the location blacklist comprises:
   submitting the term to a location-extraction engine;
   receiving an indication from the location-extraction engine that the term contains the name of a location; and
   determining that the ratio of the location score to the sum of the location score and the non-location score is less than a blacklist threshold.

6. A method for automatically identifying a term that belongs in a location blacklist, comprising, in a computer, performing the operations of:
   receiving a term to be evaluated, the term including one or more words; retrieving a non-location score for the term, wherein the non-location score is determined from log data, the log data indicating how frequently the term was entered within a non-location input box, the non-location input box for specifying what a user is searching for in search queries;
   retrieving a location score for the term, wherein the location score is determined from the log data, the log data indicating how frequently the term was entered within a location input box, the location input box for specifying a geographical location associated with search queries; and
   determining, whether the term belongs in a location blacklist based on the non-location score and the location score, wherein the term belongs in the location blacklist if the term contains the name of a geographic location but does not refer to the geographic location.

7. The method of claim 6, wherein the non-location score for the term is determined from the number of times that the term appears in the non-location box of a search engine interface that includes the non-location box for receiving terms specifying what a user is searching for and the location box for receiving terms specifying a geographic location within which the user is searching.

8. The method of claim 7, wherein determining that the term belongs in the location blacklist further comprises:
   sending the term to a location extraction server (LES) as a query to determine whether the term contains a location.

9. A non-transitory computer-readable storage medium storing instructions that when executed by a computer cause the computer to perform a method for automatically identifying a standalone location, the method comprising:
   receiving a term to be evaluated, the term including one or more words; retrieving a non-location score for the term, wherein the non-location score is determined from log data, the log data indicating how frequently the term was entered within a non-location input box, the non-location input box for specifying what a user is searching for in search queries;
   retrieving a location score for the term, wherein the location score is determined from the log data, the log data indicating how frequently the term was entered within a location input box, the location input box for specifying a geographical location associated with search queries; and
   determining whether the term is a standalone location based on the non location score and the location score, wherein a standalone location is a geographic location that is identifiable by its name alone.

10. A non-transitory computer-readable storage medium storing instructions that when executed by a computer cause the computer to perform a method for
   automatically identifying a term that belongs in a location blacklist, the method comprising: receiving a term to be evaluated, the term including one or more words;
   retrieving a non-location score for the term, wherein the non-location score is determined from log data, the log data indicating how frequently the term was entered within a non-location input box, the non-location input box for specifying what a user is searching for in search queries;
   retrieving a location score for the term, wherein the location score is determined from the log data, the log data indicating how frequently the term was entered within a location input box, the location input box for specifying a geographical location associated with search queries; and
   determining whether the term belongs in a location blacklist based on the non-location score and the location score, wherein the term belongs in the location blacklist if the term contains the name of a geographic location but does not refer to the geographic location.

11. An apparatus that automatically identifies a standalone location, comprising: a processor;
a memory coupled to the processor; wherein the memory stores instructions operable to cause the processor to:
receive a term to be evaluated, the term including one or more words;
retrieve a non-location score for the term, wherein the non-location score is determined from log data, the log data indicating how frequently the term was entered within a non-location input box, the non-location input box for specifying what a user is searching for in search queries;
retrieve a location score for the term, wherein the location score is determined from the log data, the log data indicating how frequently the term was entered within a location input box, the location input box for specifying a geographical location associated with search queries; and
determine whether the term is a standalone location based on the non-location score and the location score, wherein a standalone location is a geographic location that is identifiable by its name alone.

12. The apparatus of claim 11, wherein the instructions to determine whether the term is a standalone location comprise instructions to:
determine a normalized location indicator as the ratio of the location score to the sum of the location score and the non-location score; and
determine whether the normalized location indicator is greater than a standalone threshold.

13. An apparatus that automatically identifies a term that belongs in a location blacklist, comprising: a processor;
a memory coupled to the processor; wherein the memory stores instructions that when executed cause the processor to:
receive a term to be evaluated, the term including one or more words; retrieve a non-location score for the term, wherein the non-location score is determined from log data the log data indicating how frequently the term was entered within a non-location input box, the non-location input box for specifying what a user is searching for in search queries;
retrieve a location score for the term, wherein the location score is determined from the log data, the log data indicating how frequently the term was entered within a location input box, the location input box for specifying a geographical location associated with search queries; and
determine whether the term belongs in the location blacklist based on the non-location score and the location score, wherein the term belongs in the location blacklist if the term contains the name of a geographic location but does not refer to the geographic location.

14. The apparatus of claim 13, wherein the instructions to determine whether the term belongs in the location blacklist further comprise instructions to:
determine a normalized location indicator as a ratio of the location score to the sum of the location score and the non-location score; and
determine that the normalized location indicator is less than a blacklist threshold.

15. The apparatus of claim 14, wherein the instruction to determine whether the term belongs in the location blacklist further comprises instructions to:
send the term t to a location extraction server (LES) as a query to determine whether the term contains a location.

16. The method of claim 1, wherein determining whether the term is a standalone location further comprises:
determining a normalized location indicator as the ratio of the location score to the sum of the location score and the non-location score; and
determining whether the normalized location indicator is greater than a standalone threshold, where the term is a standalone location if the normalized location indicator is greater than the standalone threshold.

17. The method of claim 2, wherein the location score for the term is determined from the number of times that the term appears in the location box of the search engine interface.

18. The method of claim 6, wherein determining whether the term belongs in the location blacklist comprises:
determining a normalized location indicator as the ratio of the location score to the sum of the location score and the non-location score; and
determining whether the normalized location indicator is less than a blacklist threshold.

19. The method of claim 7, wherein the location score is determined from the number of times that the term appears in the location box of the search engine interface.

* * * * *